Figure 1:
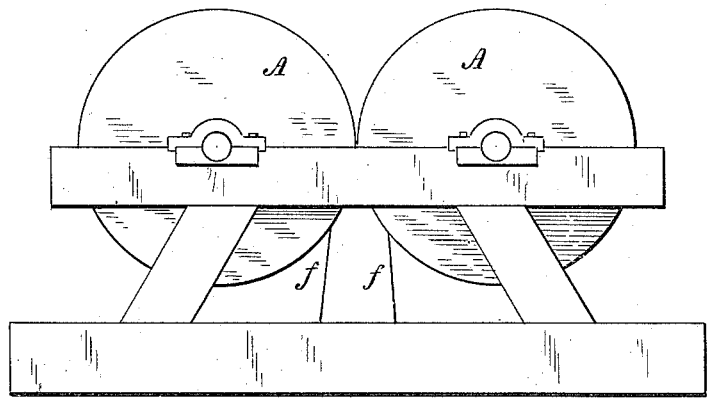

(No Model.)

J. M. WILLCOX.
MACHINERY FOR COMPRESSING AND MOLDING POWDERY AND PASTY SUBSTANCES.

No. 309,117. Patented Dec. 9, 1884.

WITNESSES:

INVENTOR
James M. Willcox

UNITED STATES PATENT OFFICE.

JAMES M. WILLCOX, OF PHILADELPHIA, PENNSYLVANIA.

MACHINERY FOR COMPRESSING AND MOLDING POWDERY AND PASTY SUBSTANCES.

SPECIFICATION forming part of Letters Patent No. 309,117, dated December 9, 1884.

Application filed June 16, 1884. (No model.)

*To all whom it may concern:*

Be it known that I, JAMES M. WILLCOX, of Philadelphia, in the State of Pennsylvania, have invented certain new and useful Improvements in Machinery for Compressing and Molding Powdery and Pasty Substances, of which the following is a specification.

There are various granular or powdery and pasty substances that have to be massed together or molded into forms in order that they may be better utilized either directly or in manufacture. Such are coal-dust, charcoal-dust, coke-dust, wood-dust, resinous powders, cement materials, artificial-stone materials, mineral, metallic, and ore powders, singly and in combination, organic farinas, doughs, dampened and pasty cement mixtures, &c. If such be mixed with fluids, we may have, without pressure, a pasty and sticky mass that is in most cases difficult to utilize, particularly if the fluid be abundant or adhesive in character; but if they be mixed with little fluid or only dampened, we have only a powdery, loose mixture that can be solidified for use only by compression. In the latter case molding by compression is a necessity in order that the materials may be utilized for certain purposes. In the former it is often of the highest utility for certain purposes.

My invention is directed to machinery adapted to solidify and mold by compression such pasty masses and powdery masses as are above mentioned; and the object I have in view is to obtain a simple, efficient, and comparatively inexpensive machine for the purpose. I make use of a pair of grooved press-rolls which are matched together so that their grooves coincide very much in the same way as the rolls of an iron-rolling mill, and in connection with them I employ what may be termed "lifters"—that is to say, fingers which enter the grooves and serve to disengage therefrom the molded product. The machine in this form would deliver its product in continuous or endless masses, to be broken or driven up afterward, as desired. For some purposes, however, it may be desirable to sever or partially sever into pieces of definite size the product at the moment of compression. To this end I can place in the grooves cross-pieces or partitions at given intervals, which act as separators. These separators may be made with curved concave faces, so as to turn out the product in the form of linked sausages, these to be lifted from their beds in the grooves by lifters, if need be, as hereinbefore provided.

I am aware that substances like those hereinbefore named have been molded by means of a pair of iron rolls whose surfaces are covered over with sunken ellipsoidal half-cells, which must be so perfectly matched in both rolls that when the latter revolve together all the half-cells of the one roll will coincide with those of the other, thus producing, when in operation, as many complete cells as there are matched half-cells. Such rolls, however, are extremely expensive and difficult to make and keep in order. The rolls devised by me are much less expensive, are altogether simple, and can be much more easily and readily made and kept in order, besides which they are adapted to the manufacture of certain materials which cannot be produced by the celled rolls.

The nature of my improvements and the manner in which the same are or may be carried into effect will be understood by reference to the accompanying drawings, in which—

Figure 2:
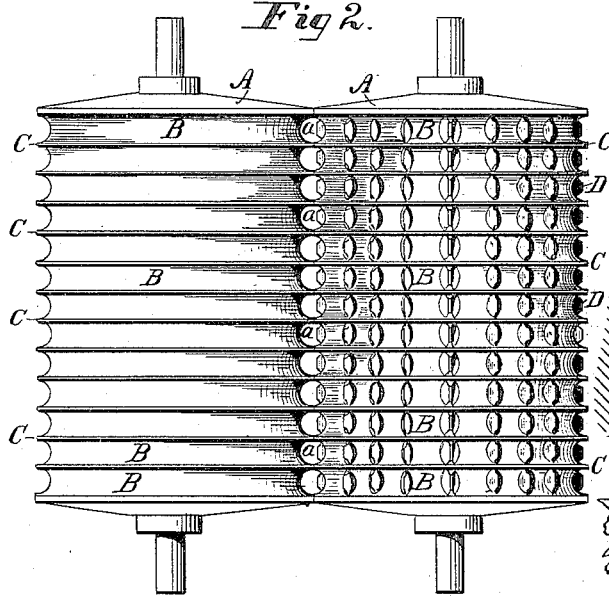
Figure 3:
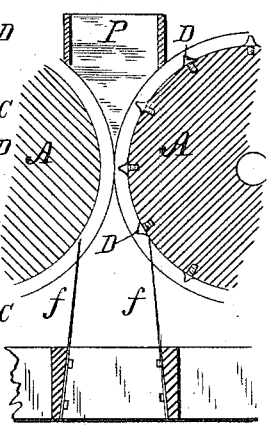
Figure 5:
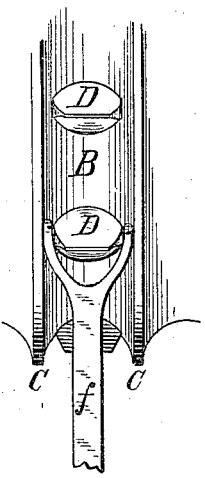
Figure 4:
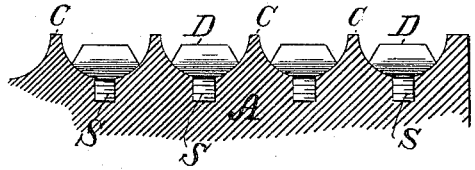
Figure 6:
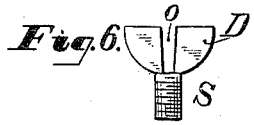

Figure 1 is an end elevation of so much of a machine embodying my invention as needed for the purposes of explanation. Fig. 2 is a plan of the two press-rolls. Fig. 3 is a cross-section of the rolls, lifters, and feed-hopper. Fig. 4 is an enlarged longitudinal section of part of one of the rolls, showing the position of the separators in the grooves. Fig. 5 is an enlarged elevation of a portion of one of the rolls, representing one of the grooves with separators therein, and also the upper end of the lifter which works in that groove. Fig. 6 is a view of a modified form of separator.

In the particular form of machine shown in the drawings one of the grooved rolls is provided with separators. This, however, may be varied. If the molded product is to be delivered in endless or continuous lengths, both rolls may be without separators. On the other hand, if the product is to be severed or partly severed into pieces of definite length, both rolls may be provided with the separators.

A A are the two press-rolls, counterparts of one another. They are preferably made of iron, and have circumferential grooves B, formed in them by planing or turning. The grooves in the two rolls match one another, and the rolls are set up in contact with one another, so that the dividing-walls C of the grooves of the one roll shall meet the dividing-walls of the other roll.

The separators with which one of the rolls is provided are shown at D. They are set in the grooves at definite intervals apart and held in place by their screw-stems S, which screw into holes tapped for them in the grooves. The separators have rounded concave faces, and their edges which have contact with the walls of the grooves are curved to conform to the curvature of those walls.

In connection with the rolls I employ lifters $f$—one for each groove. These lifters are finger-like strips, preferably of metal, which enter the grooves and lift out from them the product that has been molded. In case separators of the form shown in Figs. 4 and 5 are used, the ends of the lifters are forked, as indicated in Fig. 5, so as to straddle the separator. I can, however, use separators of the form shown in Fig. 6, where the separator has a vertical central slot, O, formed in it. With a separator of this form the lifter need not be forked, for its upper end can pass through the slot in the separator.

In operation the material passes from the hopper P and is molded and compressed between the rolls. The separators act to partially sever the product at the moment of compression, and as it passes along down the lifters disengage it from the rolls and allow it to drop. I can, if I please, so arrange the rolls that one of them—e. g., the one with separators—will have greater peripheral speed than the other. In this case the separators in the faster roll will act to push forward the partially-severed sections or divisions of the product, and so detach them.

Still another modification which can be sometimes advantageously employed is to have the grooves in one roll deeper than those in the other, or to contract the walls or edges of the grooves of one roll, so that they will take stronger hold on the compressed mass, in which case the molded mass will follow one roll continuously, and so be indented upon it and separated into parts by separators and lifters after being molded. I also remark that in some cases but one of the rolls may be grooved, the two rolls being arranged together, as before provided, so as to exert molding-pressure upon the mass passing between them.

What I claim herein as new and of my own invention is—

1. The combination of molding or compressing rolls, grooved substantially as hereinbefore provided, and lifters, substantially as and for the purposes hereinbefore set forth.

2. The combination of molding or compressing rolls, grooved substantially as hereinbefore provided, and separators carried by said rolls and arranged in the grooves therein, substantially as and for the purposes hereinbefore set forth.

3. The combination of molding or compressing rolls, grooved substantially as hereinbefore provided, separators, and lifters, substantially as and for the purposes hereinbefore set forth.

In testimony whereof I have hereunto set my hand this 14th day of June, 1884.

JAMES M. WILLCOX.

Witnesses:
J. PERCY KEATING,
MICHAEL J. GLENNEN.